(12) United States Patent
Iida

(10) Patent No.: US 12,572,866 B2
(45) Date of Patent: Mar. 10, 2026

(54) STORE MANAGEMENT SYSTEM AND STORE MANAGEMENT METHOD

(71) Applicant: NEC Corporation, Tokyo (JP)

(72) Inventor: Masafumi Iida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 18/292,361

(22) PCT Filed: Aug. 5, 2021

(86) PCT No.: PCT/JP2021/029152
§ 371 (c)(1),
(2) Date: Jan. 26, 2024

(87) PCT Pub. No.: WO2023/012977
PCT Pub. Date: Feb. 9, 2023

(65) Prior Publication Data
US 2024/0346413 A1 Oct. 17, 2024

(51) Int. Cl.
*G06Q 10/0631* (2023.01)
(52) U.S. Cl.
CPC .............................. *G06Q 10/06315* (2013.01)
(58) Field of Classification Search
None
See application file for complete search history.

(56) References Cited

U.S. PATENT DOCUMENTS

| | | | | |
|---|---|---|---|---|
| 6,742,349 B1 * | 6/2004 | Kawai | .................... | G01K 1/026 374/E1.005 |
| 8,063,775 B2 * | 11/2011 | Reed | .................... | H04L 67/125 700/282 |
| 9,459,018 B2 * | 10/2016 | Fadell | .................... | G05B 15/02 |
| 10,504,081 B1 * | 12/2019 | Han | .................... | G06Q 20/127 |
| 2003/0084672 A1 * | 5/2003 | Pham | ........................ | A47F 3/04 62/155 |
| 2008/0195237 A1 * | 8/2008 | Mukaigawa | ........... | G06Q 10/06 700/90 |

(Continued)

FOREIGN PATENT DOCUMENTS

| | | |
|---|---|---|
| JP | 2012-194789 A | 10/2012 |
| JP | 2013-089147 A | 5/2013 |

(Continued)

OTHER PUBLICATIONS

Frontoni, Emanuele, et al. "Information management for intelligent retail environment: The shelf detector system." Information 5.2 (2014): 255-271 (Year: 2014).*

(Continued)

*Primary Examiner* — Darlene Garcia-Guerra
(74) *Attorney, Agent, or Firm* — Sughrue Mion, PLLC

(57) ABSTRACT

The present invention provides a store management system (10) including; a store status information acquisition unit (11) that acquires store status information indicating a status of a target store; a real-time modification unit (12) that modifies, based on the store status information, an operation plan being determined based on a characteristic of the target store; and an output unit (13) that outputs control information indicating a setting on equipment installed in the target store being defined by the modified operation plan.

18 Claims, 11 Drawing Sheets

(56) References Cited

U.S. PATENT DOCUMENTS

| | | | |
|---|---|---|---|
| 2010/0114550 A1* | 5/2010 | Fujihara | G06F 30/20 |
| | | | 703/13 |
| 2012/0042672 A1* | 2/2012 | Fujihara | F24F 3/14 |
| | | | 62/157 |
| 2012/0204582 A1* | 8/2012 | Yazaki | F25B 49/005 |
| | | | 62/154 |
| 2012/0245744 A1* | 9/2012 | Prosser | H02J 3/32 |
| | | | 700/286 |
| 2016/0004297 A1* | 1/2016 | Kazuno | G06Q 30/06 |
| | | | 713/320 |
| 2016/0283916 A1 | 9/2016 | Iwata et al. | |
| 2022/0285979 A1* | 9/2022 | Tseng | H02J 13/00002 |

FOREIGN PATENT DOCUMENTS

| | | | | |
|---|---|---|---|---|
| JP | 2015-023634 A | | 2/2015 | |
| JP | 2015-087881 A | | 5/2015 | |
| JP | 2016-008738 A | | 1/2016 | |
| JP | 2021-108079 A | | 7/2021 | |
| KR | 20210130396 A | * | 11/2021 | ............. H02J 3/003 |
| WO | 2017/131026 A1 | | 8/2017 | |

OTHER PUBLICATIONS

KR 20210130396 A1, 김재희 et al., Nov. 1, 2021, "Apparatus and Method for Predicting Power Consumption"—Machine Translation (Year: 2021).*

Wang, An-Ping, and Pau-Lo Hsu. "The network-based energy management system for convenience stores." Energy and buildings 40.8 (2008): 1437-1445 (Year: 2008).*

International Search Report for PCT Application No. PCT/JP2021/029152, mailed on Nov. 2, 2021.

* cited by examiner

FIG. 1

STORE EQUIPMENT GROUP

3

STORE SERVER

2

CENTER SERVER

1

STORE MANAGEMENT SYSTEM

CENTER SERVER 1

STORE SERVER 2

STORE EQUIPMENT GROUP 3

STORE MANAGEMENT SYSTEM 10

FIG. 4

INPUT/
OUTPUT I/F — 3A

5A

PROCESSOR

MEMORY

PERIPHERAL
CIRCUIT

Figure 7:
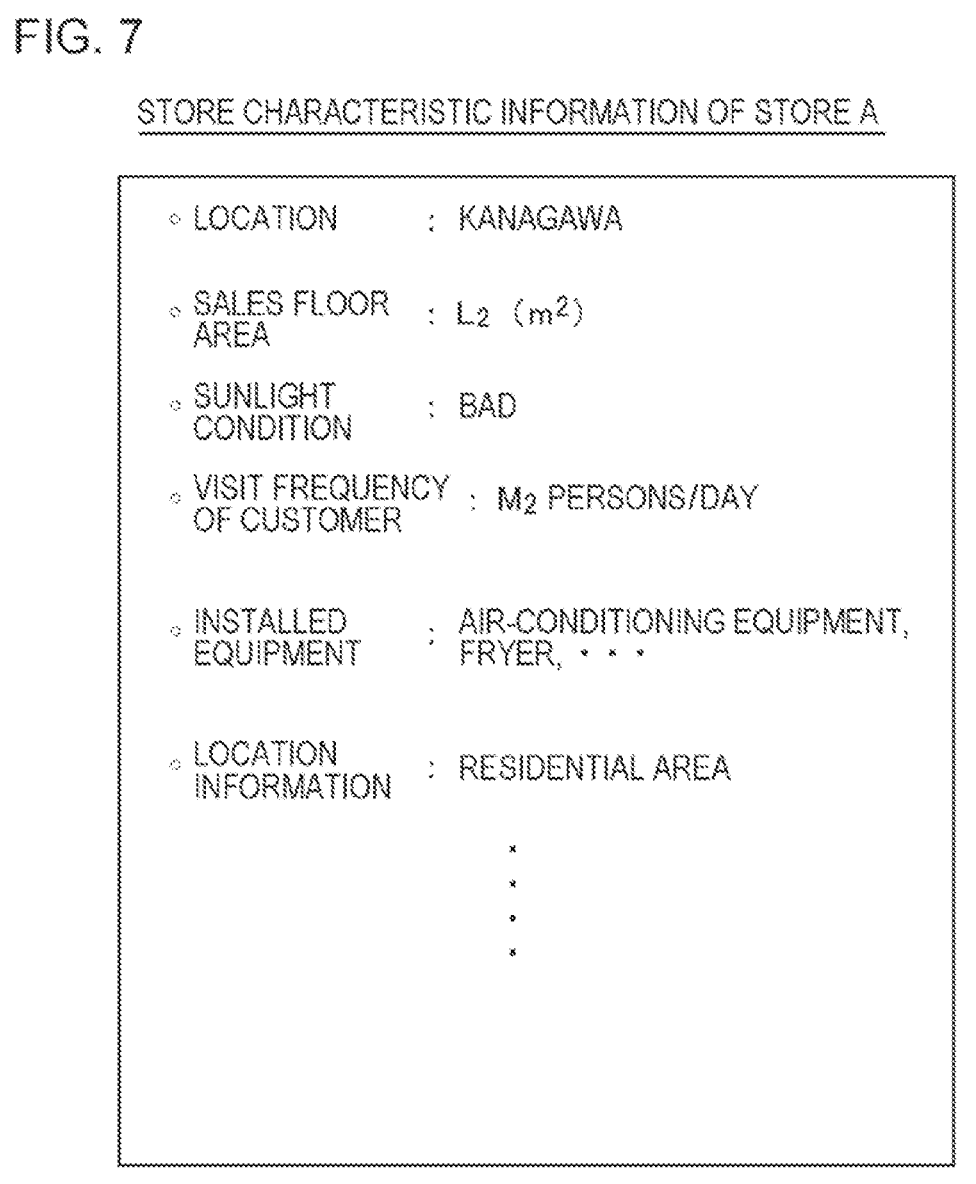

STORE CHARACTERISTIC INFORMATION OF STORE A

○ LOCATION          : KANAGAWA

○ SALES FLOOR      : $L_2$ $(m^2)$
  AREA

○ SUNLIGHT          : BAD
  CONDITION

○ VISIT FREQUENCY  : $M_2$ PERSONS/DAY
  OF CUSTOMER

○ INSTALLED         : AIR-CONDITIONING EQUIPMENT,
  EQUIPMENT          FRYER, · · ·

○ LOCATION          : RESIDENTIAL AREA
  INFORMATION

Figure 8:
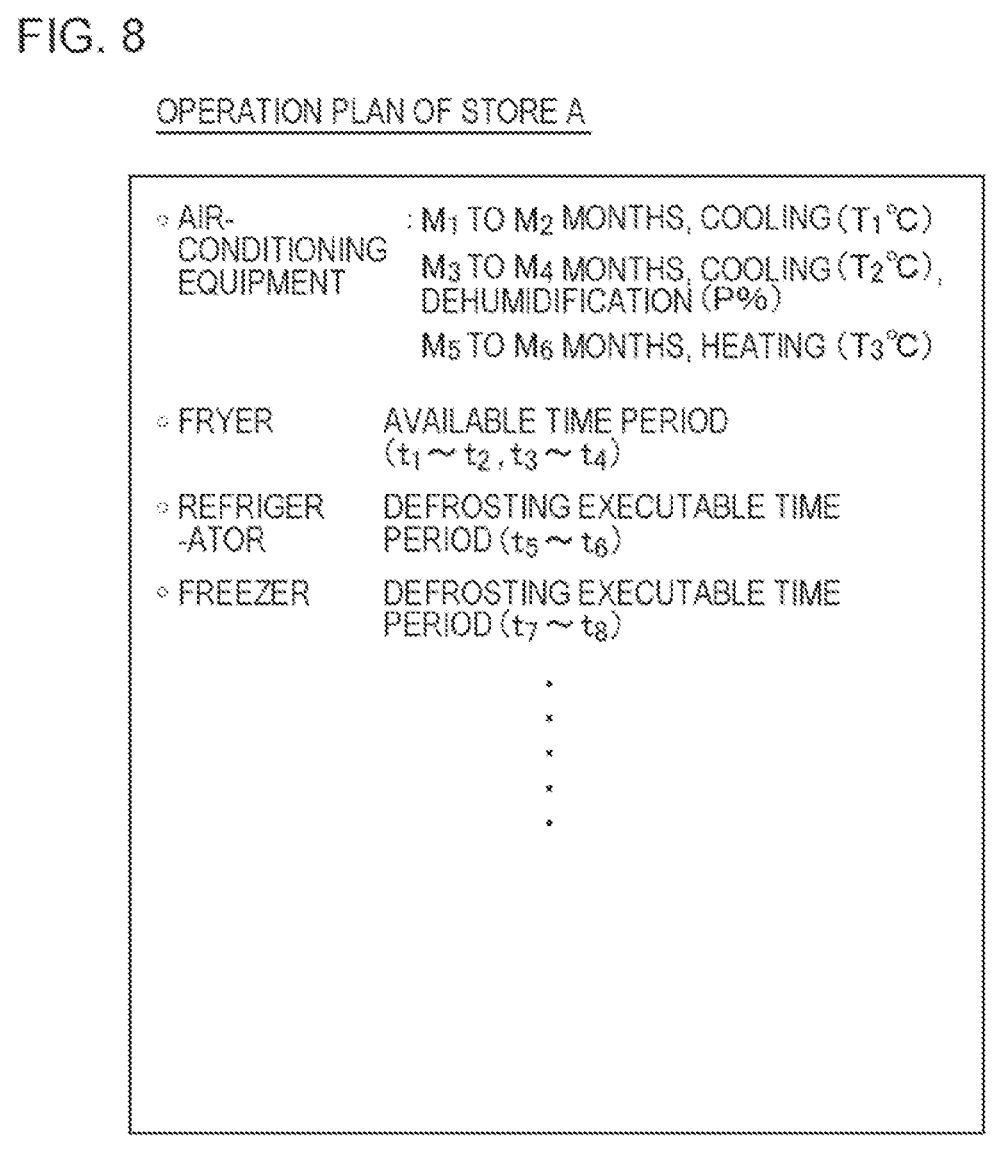

OPERATION PLAN OF STORE A

- AIR-CONDITIONING EQUIPMENT : $M_1$ TO $M_2$ MONTHS, COOLING ($T_1$ °C)

$M_3$ TO $M_4$ MONTHS, COOLING ($T_2$ °C), DEHUMIDIFICATION (P%)

$M_5$ TO $M_6$ MONTHS, HEATING ($T_3$ °C)

- FRYER     AVAILABLE TIME PERIOD ($t_1 \sim t_2$, $t_3 \sim t_4$)

- REFRIGER-ATOR     DEFROSTING EXECUTABLE TIME PERIOD ($t_5 \sim t_6$)

- FREEZER     DEFROSTING EXECUTABLE TIME PERIOD ($t_7 \sim t_8$)

FIG. 9

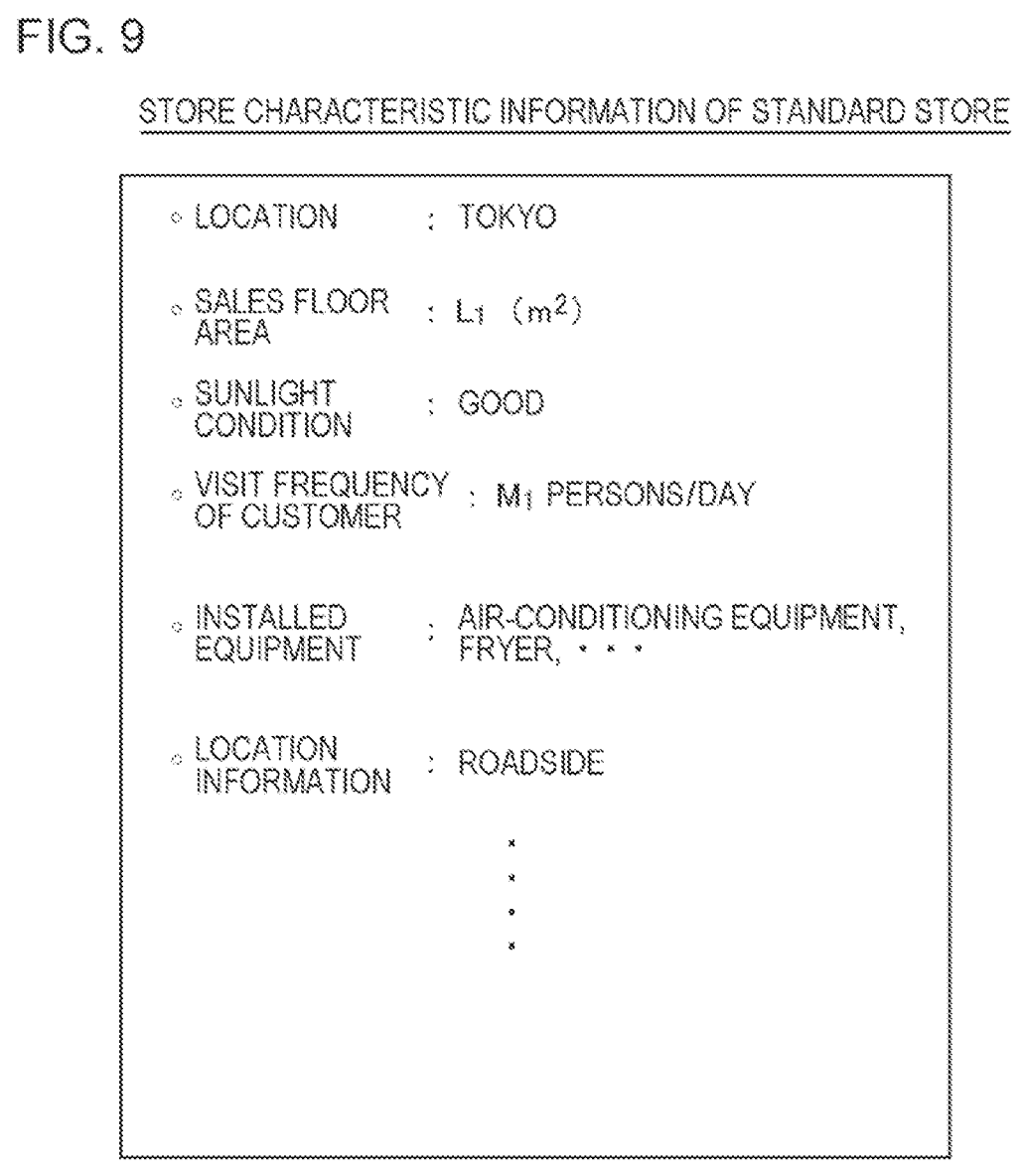

STORE CHARACTERISTIC INFORMATION OF STANDARD STORE

- LOCATION : TOKYO

- SALES FLOOR AREA : $L_1$ $(m^2)$

- SUNLIGHT CONDITION : GOOD

- VISIT FREQUENCY OF CUSTOMER : $M_1$ PERSONS/DAY

- INSTALLED EQUIPMENT : AIR-CONDITIONING EQUIPMENT, FRYER, · · ·

- LOCATION INFORMATION : ROADSIDE

FIG. 10

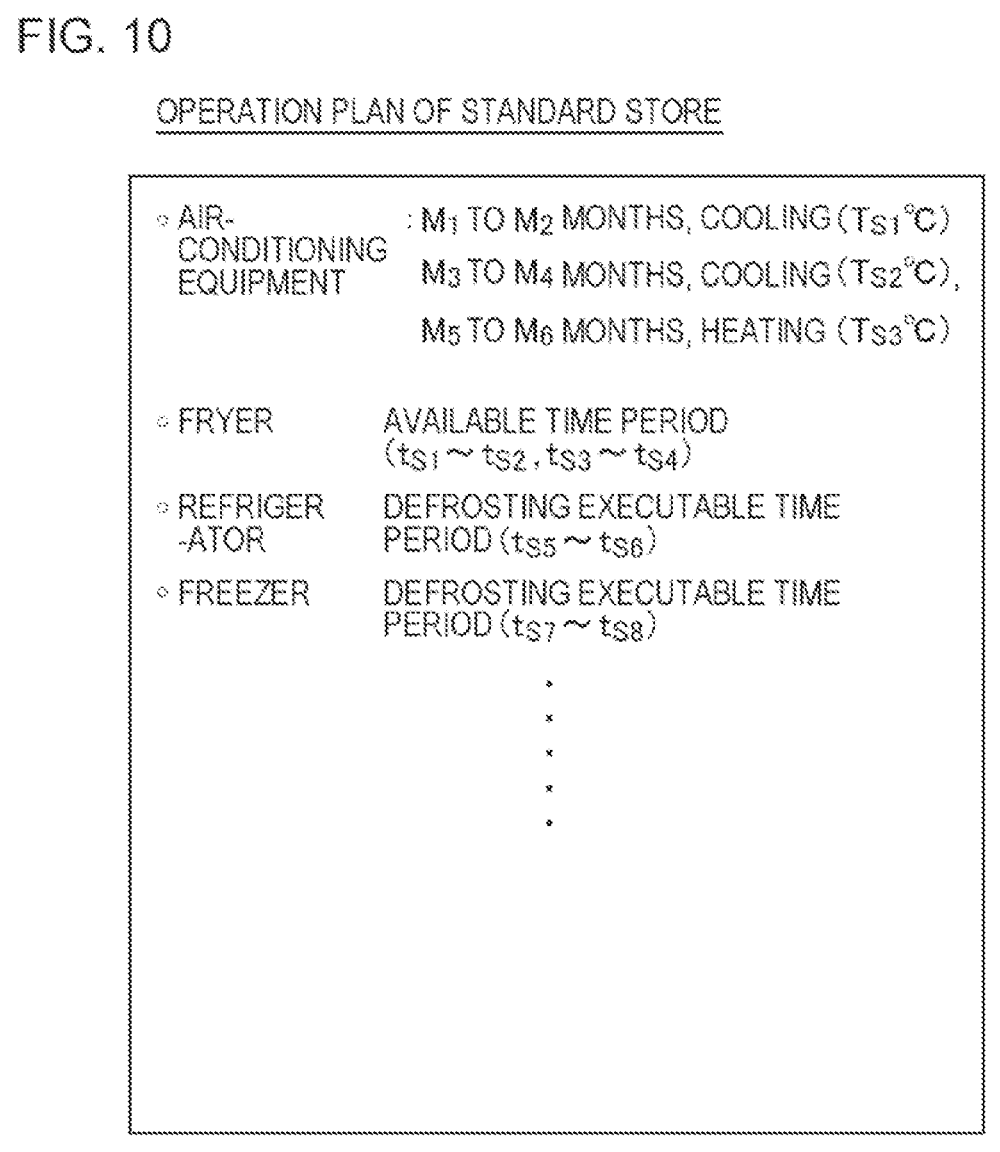

OPERATION PLAN OF STANDARD STORE

○ AIR-CONDITIONING EQUIPMENT : $M_1$ TO $M_2$ MONTHS, COOLING ($T_{S1}$°C)

$M_3$ TO $M_4$ MONTHS, COOLING ($T_{S2}$°C), $M_5$ TO $M_6$ MONTHS, HEATING ($T_{S3}$°C)

○ FRYER       AVAILABLE TIME PERIOD
($t_{S1} \sim t_{S2}$, $t_{S3} \sim t_{S4}$)

○ REFRIGER-ATOR       DEFROSTING EXECUTABLE TIME PERIOD ($t_{S5} \sim t_{S6}$)

○ FREEZER       DEFROSTING EXECUTABLE TIME PERIOD ($t_{S7} \sim t_{S8}$)

STORE MANAGEMENT SYSTEM AND STORE MANAGEMENT METHOD

This application is a National Stage Entry of PCT/JP2021/029152 filed on Aug. 5, 2021, the contents of all of which are incorporated herein by reference, in their entirety.

TECHNICAL FIELD

The present invention relates to a store management system and a store management method.

BACKGROUND ART

A technique associated with the present invention is disclosed in Patent Documents 1 and 2.

Patent Document 1 discloses a technique in which an arithmetic apparatus installed in a headquarters computes a recommended setting value of air-conditioning equipment in each store, based on a store temperature or the like of each store.

Patent Document 2 discloses a technique in which an upper limit value of electric power consumption of each store is allocated within an upper limit value of total electric power consumption of an entirety of a plurality of predetermined stores. For example, a weight is applied according to point of sales (POS) information of each store, and the upper limit value of electric power consumption of each store is allocated.

RELATED DOCUMENT

Patent Document

Patent Document 1: Japanese Patent Application Publication No. 2015-23634
Patent Document 2: International Patent Publication No. WO 2017/131026

DISCLOSURE OF THE INVENTION

Technical Problem

In a business entity including a plurality of stores such as a convenience store and a supermarket, a technique for suppressing electric power consumption of an entirety of a plurality of stores has been desired. Managing by a unified standard, in place of leaving, to each store, a setting on equipment such as air-conditioning equipment installed in each store enables to manage electric power consumption of the entirety of a plurality of stores. Further, appropriately defining the unified standard makes it possible to suppress electric power consumption of the entirety of the plurality of stores.

In the technique disclosed in Patent Document 1, although a setting on equipment installed in a plurality of stores are managed by a unified standard, there is room for improvement regarding the unified standard. In the technique disclosed in Patent Document 1, although the setting on the equipment of each store are adjusted based on a status (such as a store temperature) of each store at the occasion, characteristics of each store such as a location, a sales floor area, and a visitor frequency are not considered.

When a characteristic of a store differs, an optimum setting on equipment also differs. In a case where a difference in a characteristic of a store is not considered, for example, in a shady and relatively cool store being present in a building, waste such as setting a temperature of cooling equipment unnecessarily low or the like may occur. Neither Patent Document 1 nor 2 discloses the problem, and a solving means thereof.

An object of the present invention is to provide a technique for suppressing electric power consumption of a store.

Solution to Problem

The present invention provides a store management system including:
- a store characteristic information acquisition unit that acquires store characteristic information indicating a characteristic of a target store:
- a store status information acquisition unit that acquires store status information indicating a status of the target store; and
- a generation unit that generates control information indicating a setting on equipment installed in the target store, based on the store characteristic information and the store status information.

Further, the present invention provides a store management method including, by a computer:
- a store characteristic information acquisition step of acquiring store characteristic information indicating a characteristic of a target store;
- a store status information acquisition step of acquiring store status information indicating a status of the target store; and
- a generation step of generating control information indicating a setting on equipment installed in the target store, based on the store characteristic information and the store status information.

Advantageous Effects of Invention

According to the present invention, a technique for effectively suppressing electric power consumption of a store is achieved.

BRIEF DESCRIPTION OF THE DRAWINGS

FIG. 1 is a diagram illustrating a configuration example of a store management system according to a present example embodiment.

FIG. 2 is a diagram illustrating a configuration example of the store management system according to the present example embodiment.

FIG. 4 is a diagram illustrating one example of a hardware configuration of the store management system according to the present example embodiment.

FIG. 7 is a diagram schematically illustrating one example of information to be processed by the store management system according to the present example embodiment.

FIG. 8 is a diagram schematically illustrating one example of information to be processed by the store management system according to the present example embodiment.

FIG. 9 is a diagram schematically illustrating one example of information to be processed by the store management system according to the present example embodiment.

FIG. 10 is a diagram schematically illustrating one example of information to be processed by the store management system according to the present example embodiment.

DESCRIPTION OF EMBODIMENTS

Figure 3:
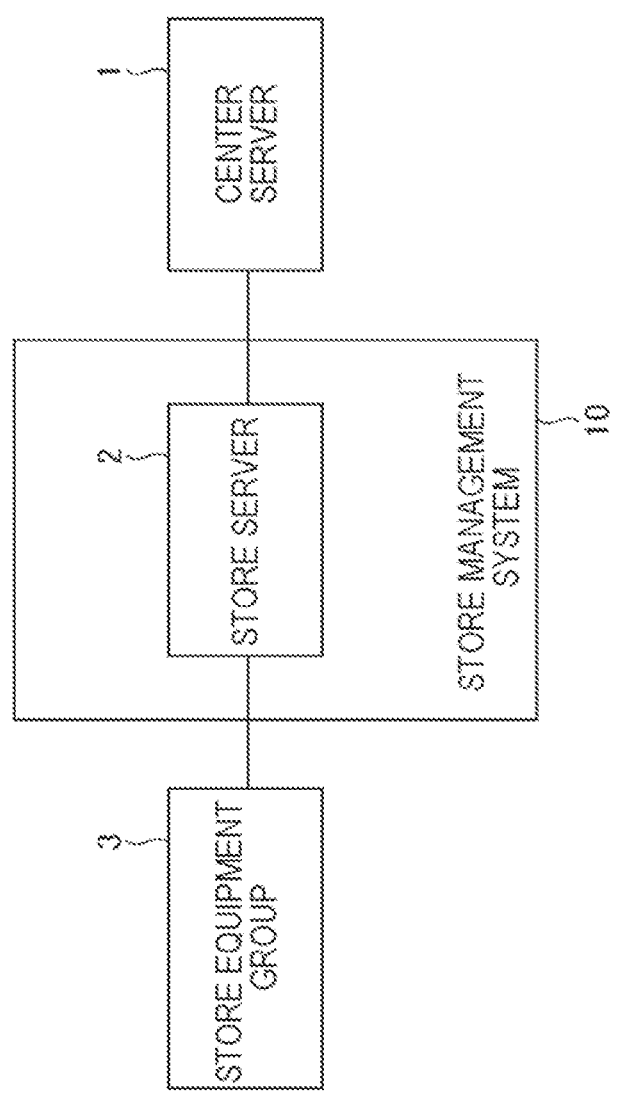
FIG. 3 is diagram illustrating a configuration example of the store management system according to the present example embodiment.

Hereinafter, example embodiments according to the present invention are described by using the drawings. Note that, in all drawings, a similar constituent element is indicated by a similar reference sign, and description thereof is omitted as necessary.

First Example Embodiment

"Overview"

A store management system according to a present example embodiment is utilized in a business entity including a plurality of stores such as a convenience store and a supermarket. The store management system manages, by a unified standard, a setting on equipment installed in each store. "Managing by a unified standard" does not mean making the same setting, but means making a setting suitable for each store being determined by the unified standard. Therefore, a setting on equipment in a plurality of stores may be the same, or may be different from each other.

The store management system acquires store characteristic information indicating a characteristic of each store, and store status information indicating a status of each store at the occasion, and generates and outputs control information indicating a setting on equipment installed in each store, based on the store characteristic information and the store status information.

In a store management system according to the present example embodiment as described above, it is possible to appropriately determine a setting on equipment installed in each store, based on both of a characteristic of each store, and a status of each store at the occasion. In this way, in a store management system capable of appropriately determining a setting on equipment for each store, based on both of a characteristic of each store, and a status of each store at the occasion, it becomes possible to effectively suppress waste of electric power consumption of each store. Consequently, it becomes possible to effectively suppress electric power consumption of an entirety of a plurality of stores.

"Hardware Configuration"

Next, one example of a hardware configuration of the store management system is described.

Figure 1:
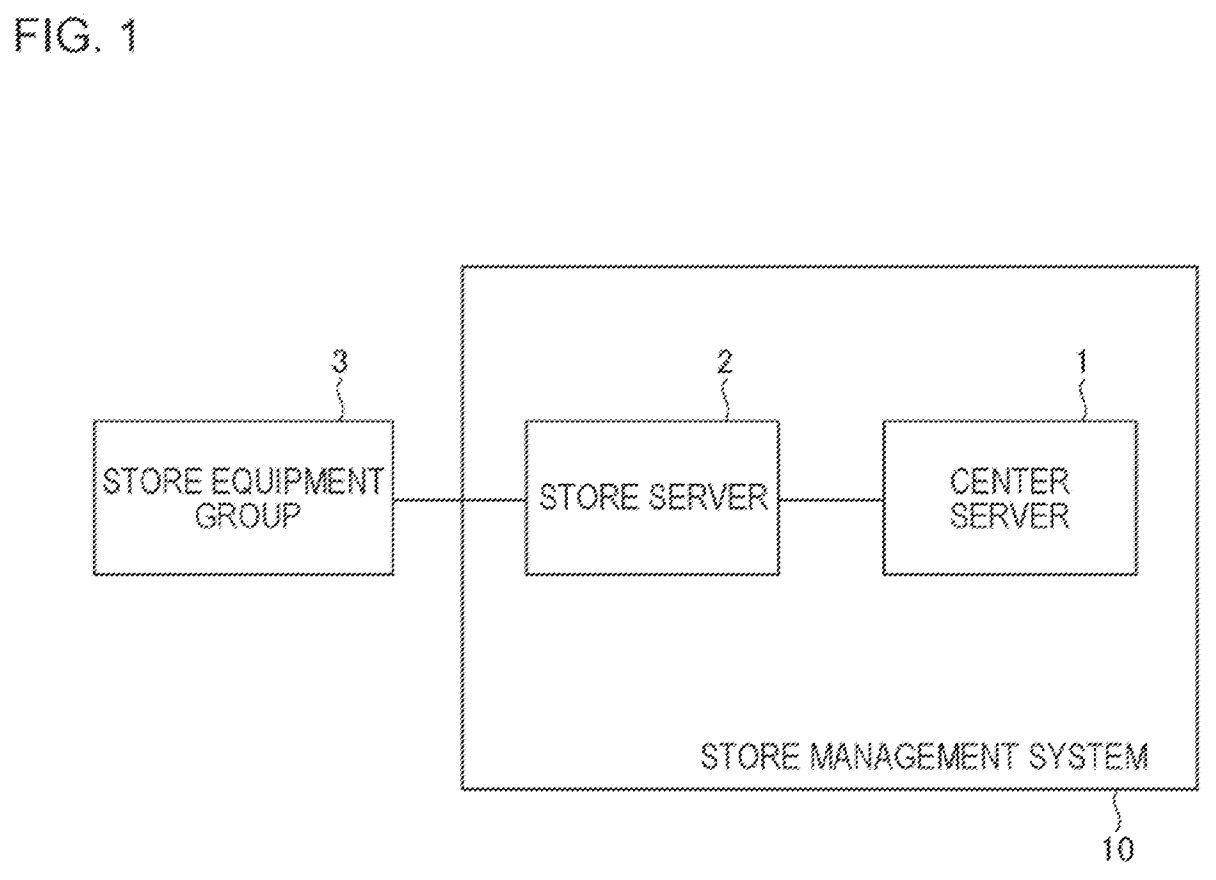

As illustrated in FIG. 1, for example, a store management system 10 is configured to include a store server 2 installed in each store, and a center server 1 installed in a headquarters or the like. The store server 2 and the center server 1 are communicably connected to each other. The store server 2 in each store is configured to be communicable with each of a plurality of pieces of equipment (store equipment group 3) installed in each store. The store equipment group 3 includes at least one of a POS system, a personal computer, air-conditioning equipment, a refrigerator, a freezer, an illumination, kitchenware, a microwave oven, and a coffee maker. The store equipment group 3 may include another piece of equipment.

Figure 2:
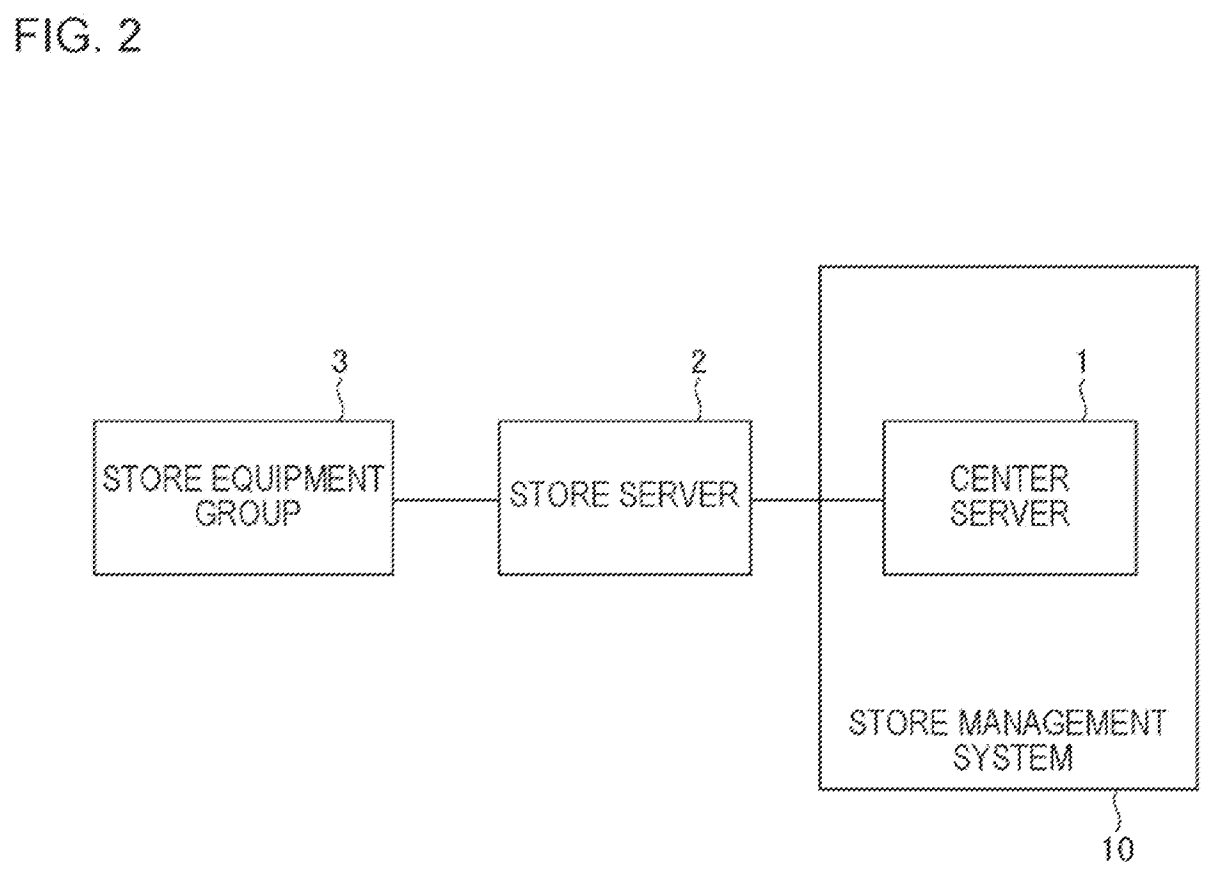

As another example, as illustrated in FIG. 2, the store management system 10 may include the center server 1, and may not include the store server 2. As another example, as illustrated in FIG. 3, the store management system 1 may include the store server 2, and may not include the center server 1.

Figure 4:
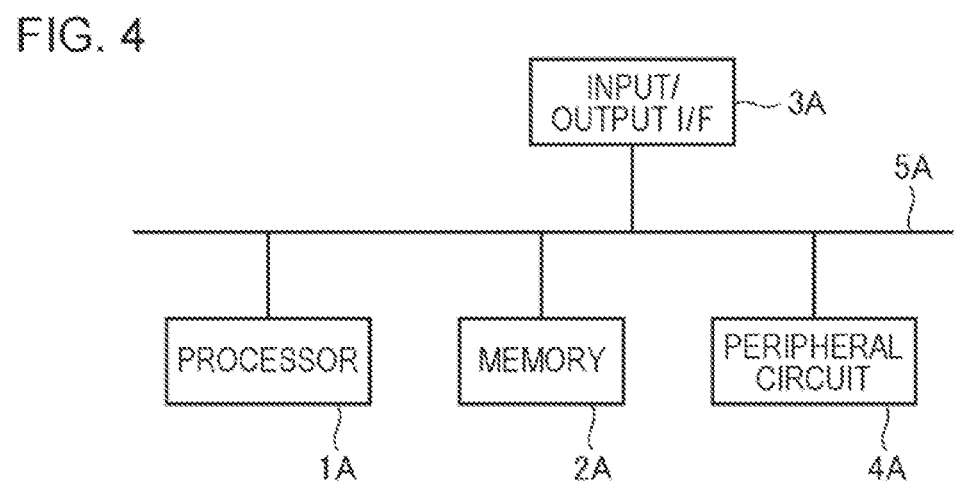

FIG. 4 is a diagram illustrating a hardware configuration example of an apparatus constituting the store management system 10. Each functional unit included in the store management system 10 is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. Further, it is understood by a person skilled in the art that there are various modification examples as a method and an apparatus for achieving the configuration.

As illustrated in FIG. 4, the store management system 10 includes a processor 1A, a memory 2A, an input/output interface 3A, a peripheral circuit 4A, and a bus 5A. The peripheral circuit 4A includes various modules. The store management system 10 may not include the peripheral circuit 4A. Note that, the store management system 10 may be constituted of a plurality of apparatuses that are physically and/or logically separated, or may be constituted of one apparatus that is physically and logically integrated. In a case where the store management system 10 is constituted of a plurality of apparatuses that are physically and/or logically separated, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, and the like, an interface for outputting information to an output apparatus, an external apparatus, an external server, and the like, and the like. The input apparatus is, for example, a keyboard, a mouse, a microphone, and the like. The output apparatus is, for example, a display, a speaker, a printer, a mailer, and the like. The processor 1A can issue a command to each module, and perform an arithmetic operation, based on an arithmetic operation result of each module.

"Functional Configuration"

Figure 5:
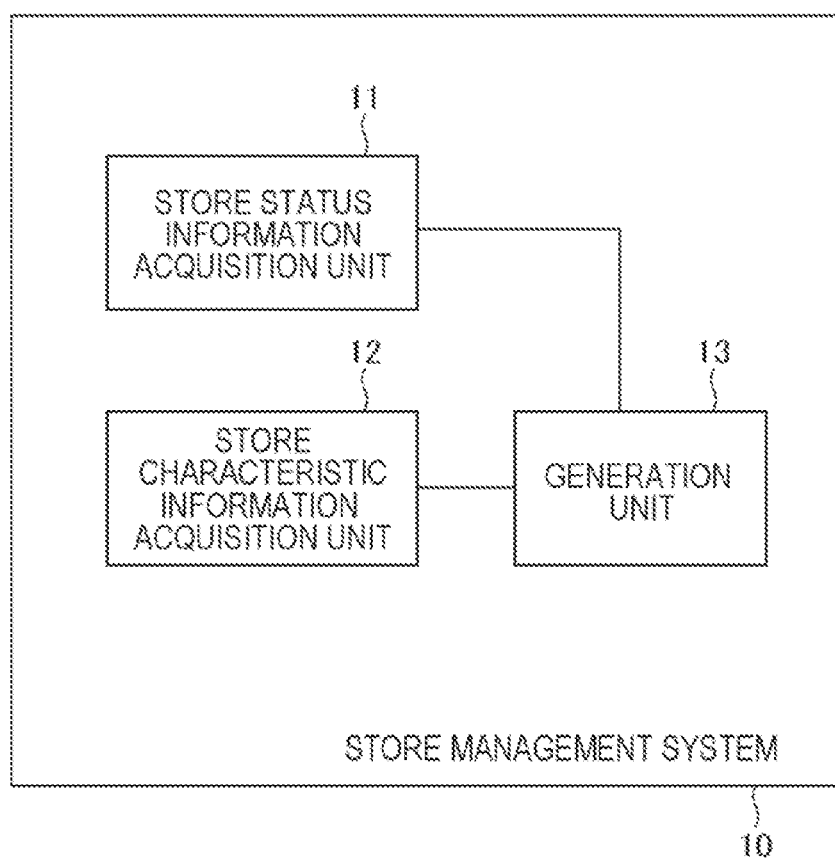
FIG. 5 is a diagram illustrating one example of a functional block diagram of the store management system according to the present example embodiment.

Next, a functional configuration of the store management system 10 is described. FIG. 5 illustrates one example of a functional block diagram of the store management system 10. As illustrated in FIG. 5, the store management system 10 includes a store status information acquisition unit 11, a store characteristic information acquisition unit 12, and a generation unit 13.

The store characteristic information acquisition unit 12 acquires store characteristic information indicating a characteristic of a target store.

A "target store" is a processing target in which a setting on equipment in a plurality of stores is determined.

A "characteristic of a store" is indicated by a value of one or a plurality of items that may affect a setting on equipment installed in a store. The item indicating a characteristic of a store is not the one in which a value may change moment by moment, but the one in which a value is fixed or almost fixed. "Almost fixed" means that a value changes at a relatively long cycle such as once several weeks, once several months, or once a year. Hereinafter, an item indicating a characteristic of a store is referred to as a "store characteristic item". A specific example of the store characteristic item is described in the following example embodiment.

"Equipment" is equipment that is installed in a store and consumes electric power, and for example, includes at least one of a POS system, a personal computer, air-conditioning equipment, a refrigerator, a freezer, an illumination, kitchenware, a microwave oven, and a coffee maker.

A "setting on equipment" is a condition being defined in association with each piece of equipment. As one example of the setting on equipment, a setting being input/specified for equipment itself and being referred to in computer control of the equipment itself, such as an operation mode (such as cooling, dehumidification, heating, and blowing air) of air-conditioning equipment, a set temperature of air-conditioning equipment, set humidity of air-conditioning equipment, an air flow rate of air-conditioning equipment, a set temperature of a refrigerator, a set temperature of a freezer, an illuminance of an illumination, and a temperature of a fryer, is included. In addition, the setting on equipment may not be a setting being referred to in computer control of the equipment itself, such as an available time period of a fryer, or a defrosting executable time period of a refrigerator and a freezer, but may include a determined event related to work of an operator using equipment, work of an operator for equipment, and the like.

The store characteristic information acquisition unit 12 can acquire store characteristic information of a target store being stored in advance in the center server 1 or the store server 2.

The store status information acquisition unit 11 acquires store status information indicating a status of a target store.

A "status of a store" is indicated by a value of one or a plurality of items that may affect a setting on equipment installed in a store. The item indicating a status of a store may change moment by moment (may change from time to time). Hereinafter, an item indicating a status of a store is referred to as a "store status item". "Store status information" includes a value of the store status item. A value is a concept including a numerical value and a character string (hereinafter, the same is applied). A value of the store status item may be an actually measured value, or may be a predicted value. A specific example of the store status item is described in the following example embodiment.

The store status information acquisition unit 11 may acquire store status information from the center server 1 or the store server 2, or may acquire store status information from an external server other than these servers. Further, the store status information acquisition unit 11 may acquire store status information from a sensor installed in a store or another information collection apparatus.

The store status information acquisition unit 11 may periodically and repeatedly acquire latest store status information (example: acquire at every predetermined time interval), or may acquire latest store status information in response to occurrence of a predetermined event. As the predetermined event, for example, timing at which electric power consumption of an entirety of a store exceeds a reference value, and the like are exemplified, but the predetermined event is not limited thereto.

The generation unit 13 generates and outputs control information indicating a setting on equipment installed in a target store, based on store characteristic information and store status information of the target store.

"Control information" is information to be input to each piece of equipment, and may be a signal for changing a setting on each piece of equipment. In this case, the equipment changes the setting on the own equipment, based on control information input from the generation unit 13. For example, air-conditioning equipment changes an operation mode, a set temperature, set humidity, and the like, based on control information input from the generation unit 13.

In addition, control information may be information to be input to equipment including an output apparatus (such as a display, a projection apparatus, and a speaker), as exemplified by a personal computer, a POS system, or the like. In this case, information indicating the setting on equipment is displayed via the output apparatus. For example, an operation mode, a set temperature, and set humidity of air-conditioning equipment, an available time period of a fryer, a defrosting executable time period of a refrigerator and a freezer, and the like are output via the output apparatus such as a personal computer or a POS system. An operator (salesperson and the like) in a target store can recognize the setting on equipment after change, based on information output via the output apparatus such as a personal computer or a POS system. Then, an operator can change a setting by operating the equipment, or perform work using the equipment or work for the equipment according to the setting. For example, an operator performs defrosting work of a refrigerator and a freezer during a defrosting executable time period indicated by the control information, or cook by utilizing a fryer during an available time period indicated by the control information.

Appropriate control information considering both of a characteristic of a store and a status of a store can be generated by generating control information, based on both of store characteristic information and store status information. Details on processing of generating control information, based on both of store characteristic information and store status information, are not specifically limited in the present example embodiment. A specific example is described in the following example embodiment.

Figure 6:
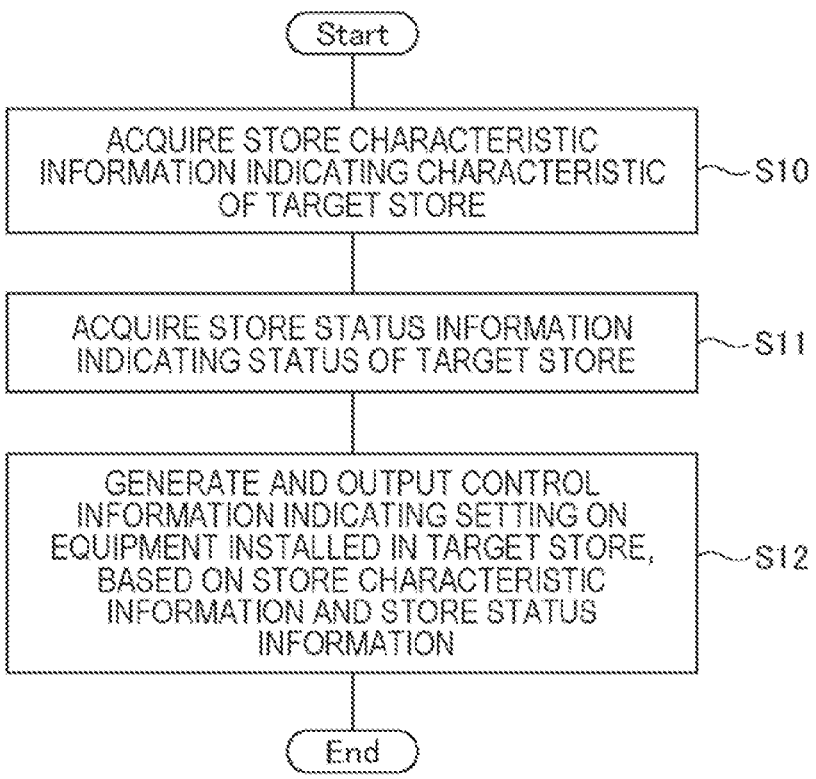
FIG. 6 is a flowchart illustrating one example of a flow of processing of the store management system according to the present example embodiment.

Next, one example of a flow of processing of the store management system 10 is described by using a flowchart in FIG. 6. Note that, herein, describing a flow of processing is a purpose. Therefore, description on details on the above-described each piece of processing, and definition of each term are omitted herein.

In S10, the store management system 10 acquires store characteristic information indicating a characteristic of a target store. In S11, the store management system 10 acquires store status information indicating a status of the target store. In S12, the store management system 10 generates and outputs control information indicating a setting on equipment installed in the target store, based on the store characteristic information and the store status information.

Advantageous Effect

In the store management system 10 according to the present example embodiment, it is possible to appropriately determine a setting on equipment installed in each store, based on both of a characteristic of each store, and a status of each store. In this way, according to a store management system capable of appropriately determining a setting on equipment for each store, based on both of a characteristic of each store and a status of each store, it becomes possible to effectively suppress waste of electric power consumption of each store. Consequently, it becomes possible to effectively suppress electric power consumption of the entirety of a plurality of stores.

Second Example Embodiment

In a present example embodiment, processing of generating control information, based on store characteristic information and store status information, is more specifically described.

—Store Status Information—

As described in the first example embodiment, store status information is information indicating a status of a store, and includes a value of a store status item. The store status item includes at least one of electric power consumption, temperature, humidity, weather information, a visitor status, a sales status, an operation status of equipment installed in a target store, an operation status for equipment installed in the target store, and a maintenance status for equipment installed in the target store. The store status item may include another item.

"Electric power consumption" includes at least any one of electric power consumption of an entirety of a store, and electric power consumption for each piece of equipment. A sensor installed in a store enables to measure electric power consumption at the occasion, and set an actual measurement value thereof, as store status information. Note that, it may be possible to estimate electric power consumption of the entirety of a store and electric power consumption for each piece of equipment in a store by utilizing a known electric power consumption prediction technique, and set the estimated value, as store status information. The estimation may be performed by a store management system 10, or may be performed by an external server.

"Temperature" is temperature in a store. A sensor installed in a store enables to measure a temperature in the store at the occasion, and set an actual measurement value thereof, as store status information. In addition, a predicted temperature of a region where each store is present and indicated by a weather forecast for each time period may be set as store status information indicating a temperature in each store. Note that, information on a weather forecast can be acquired from an external server.

"Humidity" is humidity in a store. A sensor installed in a store enables to measure humidity in the store at the occasion, and set an actual measurement value thereof, as store status information. In addition, predicted humidity of a region where each store is present and indicated by a weather forecast for each time period may be set as store status information indicating humidity in each store. Note that, information on a weather forecast can be acquired from an external server.

"Weather information" is information relating to weather other than temperature and humidity: The weather information indicates, for example, weather (fine, rainy, or cloudy), movement of rain clouds, a rain probability, a UV dose, a wind direction, wind velocity, and the like. A sensor installed in a store enables to measure weather information of the store at the occasion, and set an actual measurement value thereof, as store status information. In addition, weather information of a region where each store is present and indicated by a weather forecast for each time period may be set as store status information of each store. Note that, information on a weather forecast can be acquired from an external server.

A "visitor status" indicates the number of customers being present in a store. The visitor status may indicate the number of customers being present in a store at the occasion, or may indicate the number of customers being present in a store at a certain point of time in future (example: several minutes later, several hours later, or the like). Determining the number of customers being present in a store at the occasion can be achieved by utilizing any available technique. For example, the number can be determined by analyzing an image generated by a camera that photographs inside a store, and detecting/counting a person within the image. In addition, the number may be determined by analyzing an image generated by a camera that photographs an entrance/exit of a store, detecting a person entering the store and exiting from the store, and counting the number of customers being present in the store, based on a result of the detection. Determining the number of customers being present in a store at a certain point of time in the future can also be achieved by utilizing any available technique. For example, the number of customers being present in a store at a certain point of time in the future may be estimated, based on an estimation model that has performed machine learning on a relationship between a history on the number of visitors for each time period in a past, and a factor (such as a month, a day of the week, weather, or an event in a peripheral facility) that may affect the number of visitors. The visitor status may differ according to a store characteristic. For example, a peak time when the number of visitors rapidly increases may also differ according to a store characteristic. For example, in a store being present in a business district, there is a tendency that the number of visitors rapidly increases around noon on a weekday, but the number of visitors does not increase so much on Saturdays and Sundays. and holidays.

A "sales status" indicates a sales status of a product utilizing equipment. As a product utilizing equipment, a daily dish meal and the like to be cooked by utilizing equipment such as a fryer are exemplified, but the product is not limited thereto. A sales status of a product may indicate a sales status at a current point of time, or may indicate a sales status at a certain point of time in the future (example: several minutes later, serval hours later, and the like). The sales status indicates a sales quantity, a sales amount, and the like up to the day. For example, the store status information may be generated based on sales data registered in a POS system. Further, for example, sales of the product at a certain point of time may be estimated, based on an estimation model that has performed machine learning on a relationship between a history on sales of the product for each time period in the past, and a factor (such as a month, a day of the week, weather, or an event in a peripheral facility) that may affect the sales.

An "operation status of equipment installed in a target store" indicates whether equipment is operated. In addition, an operation status of equipment installed in a target store may further indicate a setting on equipment at the point of time. The setting on equipment herein mean a setting being input/specified for equipment itself, and being referred to in computer control of the equipment itself, such as an operation mode (such as cooling, dehumidification, heating, and blowing air) of air-conditioning equipment, a set temperature of air-conditioning equipment, set humidity of air-conditioning equipment, an air flow rate of air conditioning equipment, a set temperature of a refrigerator, a set temperature of a freezer, an illuminance of an illumination, and a temperature of a fryer. Acquisition of store status information as described above may be achieved by acquiring, from each piece of equipment, information indicating an operation status of each piece of equipment. In addition, whether each piece of equipment is operated, or the like may be determined by analyzing an image generated by a camera that photographs equipment.

An "operation status for equipment installed in a target store" indicates an opening/closing status of a door of a refrigerator and a freezer, an execution status of maintenance of equipment, and the like. The opening/closing status of a door of a refrigerator and a freezer indicates a time (a statistical time (such as an average value, a maximum value, a minimum value, a mode, or a median) per predetermined time, an integrated time of the day, and the like) when the door is opened. Acquisition of store status information as described above may be achieved by detecting opening/closing of a door by utilizing a sensor.

An "execution status of maintenance of equipment" indicates at least one of presence or absence of execution of maintenance in the past, an execution day of maintenance in the past, and an execution day of maintenance being executed most recently. As maintenance of equipment, defrosting of a refrigerator and a freezer, filter cleaning of air-conditioning equipment, and the like are exemplified, but the maintenance is not limited thereto. Acquisition of store status information as described above may be achieved by acquiring a history on maintenance execution stored in each piece of equipment. In addition, acquisition of store status information as described above may be achieved by acquiring maintenance history information on each piece of equipment being stored in a center server 1 or a store server 2.

—Store Characteristic Information—

As described in the first example embodiment, store characteristic information is information indicating a characteristic of a store, and includes a value of a store characteristic item. The store characteristic item includes at least one of a location, a sales floor area, a sunlight condition, a visitor frequency, installed equipment, and location information. The store characteristic item may include another item.

A "location" is a location of each store. The location is indicated by an address, latitude/longitude information, and the like.

A "sales floor area" is an area of a sales floor of a store.

A "sunlight condition" indicates a sunlight condition of a store. For example, the sunlight condition may be evaluated by three stages such as "good", "moderate", and "bad", or may be evaluated by another criterion.

A "visitor frequency" indicates a frequency with which a customer visits. For example, the visitor frequency may be a guideline for the number of visitors per day. The visitor frequency may be computed based on achievements in the past, or may be an expected number.

"Installed equipment" indicates equipment installed in a store.

"Location information" indicates a feature of a location where a store is installed. For example, the location where a store is installed may be classified into a "roadside", a "residential area", a "mixed area (a business area+a residential area)", a "business area", and the like. A residential area, a mixed area, and a business area can be classified, for example, based on a working population ratio. As one example of a classification criterion, an example is mentioned in which an area where the working population ratio is less than 0.4 is a residential area, an area where the working population ratio is equal to or more than 0.4 and less than 0.8 is a mixed area, and an area where the working population ratio is equal to or more than 0.8 is a business area, but the location information is not limited thereto.

FIG. 7 schematically illustrates one example of store characteristic information acquired by a store characteristic information acquisition unit 14. FIG. 7 illustrates store characteristic information of a store A being one of a plurality of stores. Store characteristic information of each of a plurality of stores may be generated in advance, and registered in at least any one of the center server 1 and the store server 2. The store characteristic information acquisition unit 14 can acquire, from the center server 1 or the store sever 2, store characteristic information of a target store.

—Processing of Generating Control Information, based on Store Characteristic Information and Store Status Information—

A generation unit 13 acquires an operation plan associated with store characteristic information of a target store. Then, the generation unit 13 adjusts an operation plan of the target store, based on store status information of the target store. Then, the generation unit 13 generates control information, based on the operation plan after adjustment. Hereinafter, the processing is described in detail.

An "operation plan" defines plan details on a setting on equipment installed in a store. An operation plan of a target store defines at least one of an operation mode of air-conditioning equipment, a set temperature of air-conditioning equipment, set humidity of air-conditioning equipment, an air flow rate of air conditioning equipment, a set temperature of a refrigerator, a set temperature of a freezer, an illuminance of an illumination, a temperature of a fryer, an available time period of a fryer, a defrosting executable time period of a refrigerator, and a defrosting executable time period of a freezer.

Electric power consumption of each piece of equipment changes according to an operation mode of air-conditioning equipment, a set temperature of air-conditioning equipment, set humidity of air-conditioning equipment, an air flow rate of air-conditioning equipment, a set temperature of a refrigerator, a set temperature of a freezer, an illuminance of an illumination, and a temperature of a fryer. Further, a time period when electric power consumption of equipment increases, or a time period when electric power consumption decreases changes according to an available time period of a fryer, a defrosting executable time period of a refrigerator, and a defrosting executable time period of a freezer. Defining a content as described above by an operation plan makes it possible to manage electric power consumption of a target store.

FIG. 8 schematically illustrates one example of an operation plan of the store A being one of a plurality of stores. In the illustrated operation plan, an operation mode, a set temperature, and set humidity of air-conditioning equipment are defined for each predetermined period. Further, in the illustrated operation plan, an available time period of a fryer is defined. Further, in the illustrated operation plan, a defrosting executable time period of a refrigerator and a freezer is defined.

An operation plan is defined for each store, based on a characteristic of a store. A person may determine an operation plan of each store, based on a characteristic of each store, or a computer may determine an operation plan of each store, based on a characteristic of each store.

Next, processing of acquiring an operation plan associated with store characteristic information of a target store is described.

—Processing Example 1 of Acquiring Operation Plan Associated with Store Characteristic Information of Target Store—

A plurality of operation plans according to a store characteristic may be generated in advance, and stored in the center server 1 or the store server 2. Further, the generation unit 13 may acquire, from the center server 1 or the store server 2, an operation plan associated with a store characteristic of a target store indicated by store characteristic information of the target store.

—Processing Example 2 of Acquiring Operation Plan Associated with Store Characteristic Information of Target Store—

The generation unit 13 generates an operation plan of a target store by adjusting an operation plan of a standard store being generated in advance, based on store characteristic information of the standard store and store characteristic information of the target store. The operation plan of the standard store after adjustment becomes the operation plan of the target store.

A "standard store" is a store in which a store characteristic is standard. Setting a store including what kind of store characteristic, as a standard store, is a design matter.

FIG. 9 schematically illustrates one example of store characteristic information of a standard store. Store characteristic information of a standard store is generated in advance, and registered in at least any one of the center server 1 and the store server 2.

FIG. 10 schematically illustrates one example of an operation plan of a standard store. An operation plan of a standard store is generated in advance, and registered in at least any one of the center server 1 and the store server 2.

Herein, one example of processing of adjusting an operation plan of a standard store as illustrated in FIG. 10, based on store characteristic information of a target store as illustrated in FIG. 7, and store characteristic information of the standard store as illustrated in FIG. 9 is described.

First, the generation unit 13 computes a difference between store characteristic information of a target store as illustrated in FIG. 7, and store characteristic information of a standard store as illustrated in FIG. 9. Then, the generation unit 13 adjusts an operation plan of the standard store as illustrated in FIG. 10, based on the computed difference. An adjustment rule in which a difference between store characteristic information of the target store, and store characteristic information of the standard store, and an adjustment content of an operation plan to be performed in a case where the difference is present are associated with each other is generated in advance. The generation unit 13 adjusts the operation plan of the standard store, based on the computed difference and the adjustment rule.

Next, processing of adjusting an operation plan of a target store, based on store status information of the target store is described.

—Processing Example 1 of Adjusting Operation Plan of Target Store, based on Store Status Information of Target Store—

The generation unit 13 adjusts an operation plan of a target store, based on a status of the target store indicated by store status information. For example, the generation unit 13 can adjust at least one of an operation mode, a set temperature, and set humidity of air-conditioning equipment indicated by an operation plan of a target store, based on store status information of the target store. Further, the generation unit 13 can adjust at least one of an available time period of a fryer, a defrosting executable time period of a refrigerator, and a defrosting executable time period of a freezer indicated by an operation plan of a target store, based on store status information of the target store. The generation unit 13 can adjust an operation plan in such a way that electric power consumption of the entirety of a store decreases. For example, an adjustment rule in which an adjustment content of an operation plan to be performed in a case where a value of one or a plurality of store status items satisfies a predetermined condition is defined may be generated in advance. Further, the generation unit 13 may determine the adjustment content of the operation plan according to the adjustment rule. The adjustment rule may be generated for each store.

—Processing Example 2 of Adjusting Operation Plan of Target Store, based on Store Status Information of Target Store—

The generation unit 13 adjusts an operation plan of a target store, based on a store electric power correlation model indicating a correlation among a status of the target store, a change in setting being performed for some pieces of equipment installed in the target store, and a change in electric power of an entirety of the plurality of pieces of equipment installed in the target store.

Herein, a store electric power correlation model is described. When a setting on a certain piece of equipment is changed in a direction in which electric power consumption decreases, although electric power consumption of the piece of equipment decreases, electric power consumption of another piece of equipment may increase according to the change. For example, in a case where a set temperature of air-conditioning equipment being operated in a cooling mode in summer is raised, although electric power consumption of the air-conditioning equipment decreases, as a result of an increase in temperature within the store, electric power consumption of another piece of equipment such as a refrigerator and a freezer may increase. Whether electric power consumption of another piece of equipment such as a refrigerator and a freezer increases due to an increase in set temperature of air-conditioning equipment may differ according to a status of a target store at the occasion being indicated by the store status information as described above. Note that, in a case where a setting on a certain piece of equipment is changed in a direction in which electric power consumption increases, although electric power consumption of the piece of equipment increases, electric power consumption of another piece of equipment may decrease according to the change.

The store electric power correlation model indicates a correlation among a status of a store as described above, a change in setting being performed for some pieces of equipment installed in the store, and a change in electric power consumption of the entirety of the plurality of pieces of equipment installed in the store. Specifically; the store electric power correlation model indicates, in a case where a setting on some pieces of equipment is changed in a status of a certain store, in what way, electric power consumption of the entirety of the store changes (increases or decreases, by what degrees, electric power consumption increases or decreases, and the like). The store electric power correlation model can be generated by machine learning based on, for example, actual measurement data. Note that, a store electric power correlation model being common among all stores may be generated, or a store electric power correlation model may be generated for each store. In addition, a store electric power correlation model may be generated for each group by classifying a plurality of stores into groups by integrating stores in which a store characteristic indicated by store characteristic information is similar to each other.

The generation unit 13 determines, regarding a store in a status indicated by store status information acquired by a store status information acquisition unit 11, a "content of change in setting for some pieces of equipment" that can lower electric power consumption of the entirety of a plurality of pieces of equipment installed in a target store, based on a store electric power correlation model as described above, and the store status information. Then, the generation unit 13 adjusts the setting related to the some pieces of equipment defined in an operation plan, based on the determined "content of change in setting for some pieces of equipment". For example, the generation unit 13 may adjust the setting related to the some pieces of equipment defined in the operation plan in such a way as to become the determined "content of change in setting for some pieces of equipment". In addition, the generation unit 13 may adjust the setting related to the some pieces of equipment defined in the operation plan in a direction that approaches the determined "content of change in setting for some pieces of equipment".

Figure 11:
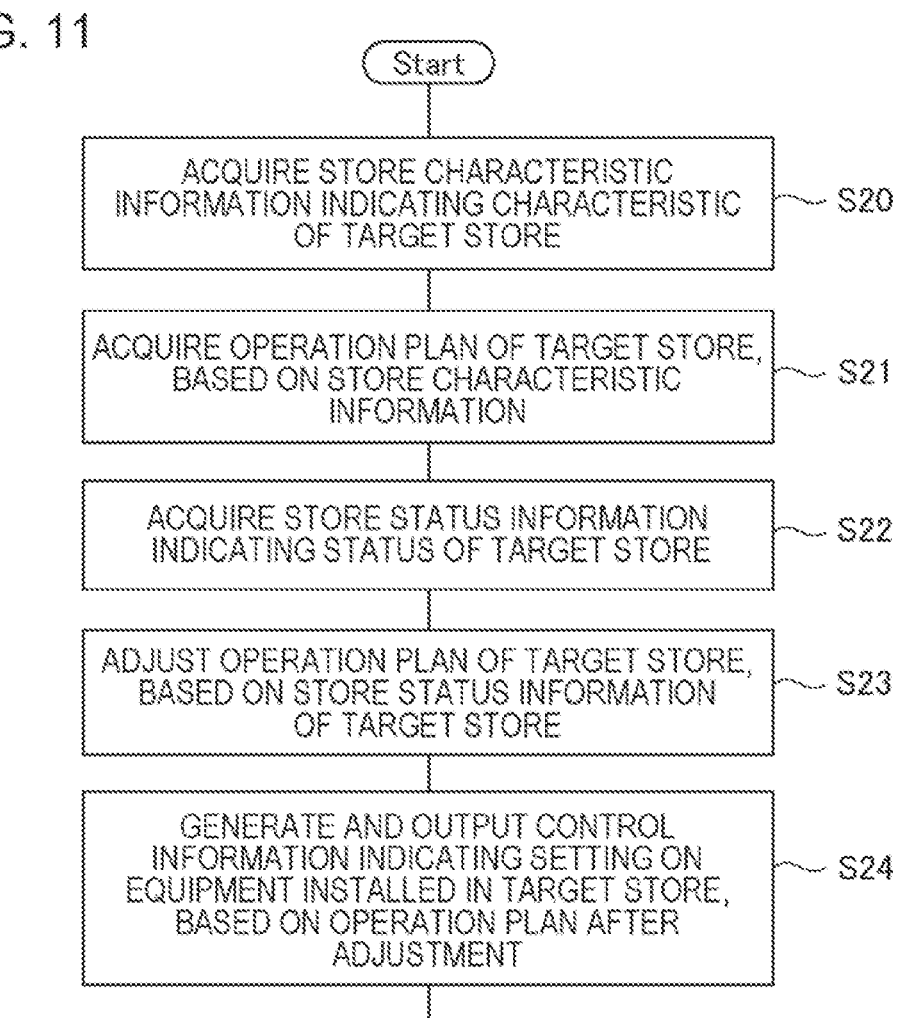
FIG. 11 is a flowchart illustrating one example of a flow of processing of the store management system according to the present example embodiment.

Next, one example of a flow of processing of the store management system 10 is described by using a flowchart in FIG. 11. Note that, herein, describing a flow of processing is a purpose. Therefore, description on details on the above-described each piece of processing, and definition of each term are omitted herein.

In S20, the store management system 10 acquires store characteristic information indicating a characteristic of a target store. In S21, the store management system 10 performs the "processing example 1 of acquiring an operation plan associated with store characteristic information of a target store" or the "processing example 2 of acquiring an operation plan associated with store characteristic information of a target store", and acquires the operation plan of the target store.

In S22, the store management system 10 acquires store status information indicating a status of the target store. In S23, the store management system 10 performs the "processing example 1 of adjusting an operation plan of a target store, based on store status information of the target store", or the "processing example 2 of adjusting an operation plan of a target store, based on store status information of the target store", and adjusts the operation plan of the target store.

In S24, the store management system 10 generates and outputs control information indicating a setting on equipment installed in the target store, based on the operation plan after adjustment.

Note that, the pieces of processing of S20 and S21 are performed at a preparatory stage before operation of the store are disclosed. The pieces of processing of S22 to S24 are performed by real-time processing during operation of the store.

The pieces of processing of S22 to S24 may be repeatedly performed at every predetermined time interval. As the predetermined time interval, every several seconds, every several minutes, every several ten minutes, every several hours, and the like are exemplified, but the predetermined time interval is not limited thereto. In addition, the pieces of processing of S22 to S24 may be performed during a time when a predetermined condition is satisfied. As the predetermined condition, for example, "electric power consumption of an entirety of a target store exceeds a reference value", and the like are exemplified, but the predetermined condition is not limited thereto. In a case of this example, "modification processing of an operation plan for reducing electric power consumption of the entirety of a target store"

in S22 to S24 is performed only during a time when electric power consumption of the entirety of the target store exceeds the reference value.

Other configurations of the store management system 10 according to the present example embodiment are similar to those of the first example embodiment.

In the store management system 10 according to the present example embodiment, an advantageous effect similar to that of the first example embodiment is achieved.

Further, in the store management system 10 according to the present example embodiment, it is possible to generate an operation plan of each store, based on at least one of a location, a sales floor area, a sunlight condition, a visitor frequency, installed equipment, and location information of each store. Further, in the store management system 10 according to the present example embodiment, it is possible to adjust an operation plan of each store, based on at least one of electric power consumption, temperature, humidity, weather information, a visitor status, and a sales status of each store at the occasion, an operation status of equipment installed in a target store, an operation status for equipment installed in the target store, and a maintenance status for equipment installed in the target store. Further, in the store management system 10 according to the present example embodiment, it is possible to generate control information indicating a setting on equipment installed in each store, based on an operation plan after adjustment. In the store management system 10 according to the present example embodiment as described above, it is possible to more advantageously reduce electric power consumption of each store.

<Third Example Embodiment>

In a present example embodiment, stores are classified into groups, based on a characteristic of a store, and an operation plan is generated for each group.

A generation unit 13 classifies a plurality of stores into groups, based on store characteristic information. The generation unit 13 generates a group by integrating stores in which a store characteristic is similar to each other. The generation unit 13 can achieve the group classification by utilizing a clustering technique (machine learning).

Further, the generation unit 13 generates an operation plan of a target store by adjusting, for each group, an operation plan of a standard store, based on store characteristic information of the standard store, and store characteristic information of each group. The operation plan of the standard store after adjustment becomes the operation plan of the target store.

Store characteristic information of each group is generated based on store characteristic information of a store belonging to each group. For example, store characteristic information of one representative store selected from among groups by any means may be set as store characteristic information of each group. In addition, new store characteristic information generated by integrating pieces of store characteristic information of a plurality of stores belonging to each group by any means may be set as store characteristic information of each group. As an integration means, for example, a means that computes a statistical value (such as a mode, a maximum value, a minimum value, a median, and an average value) for each store characteristic item is exemplified, but the integration means is not limited thereto.

Other configurations of a store management system 10 according to the present example embodiment are similar to those of the first and second example embodiments.

In the store management system 10 according to the present example embodiment, an advantageous effect similar to that of the first and second example embodiments is achieved.

Further, in the store management system 10 according to the present example embodiment, it is possible to classify a plurality of stores into groups, and generate an operation plan for each group. Therefore, as compared with a case where an operation plan is generated for each store, it is possible to reduce a processing load on a computer.

Note that, in the present specification, "acquisition" includes at least one of "fetching data stored in another apparatus or a storage medium by an own apparatus (active acquisition)", based on a user input, or based on an instruction of a program, for example, requesting or inquiring another apparatus and then receiving, accessing another apparatus or a storage medium and then reading, and the like, "inputting data being output from another apparatus to an own apparatus (passive acquisition)", based on a user input, or based on an instruction of a program, for example, receiving data being distributed (or transmitted, push notified, or the like), or selecting and acquiring from data or information being received, and "generating new data by editing data (text conversion, data rearrangement, extraction of partial data, change in a file format, and the like) or the like, and acquiring the generated new data".

A part or all of the above-described example embodiments may also be described as the following supplementary notes, but is not limited to the following.

1. A store management system including:
   a store characteristic information acquisition unit that acquires store characteristic information indicating a characteristic of a target store:
   a store status information acquisition unit that acquires store status information indicating a status of the target store; and
   a generation unit that generates control information indicating a setting on equipment installed in the target store, based on the store characteristic information and the store status information.

2. The store management system according to supplementary note 1, wherein
   the store status information includes at least one of electric power consumption, temperature, humidity, weather information, a visitor status, a sales status, an operation status of equipment installed in the target store, an operation status for equipment installed in the target store, and a maintenance status for equipment installed in the target store.

3. The store management system according to supplementary note 1, wherein
   the generation unit
      acquires an operation plan associated with the store characteristic information of the target store,
      adjusts the operation plan of the target store, based on the store status information of the target store, and
      generates the control information, based on the operation plan after adjustment.

4. The store management system according to supplementary note 3, wherein
   the operation plan defines at least one of an operation mode of air-conditioning equipment, a set temperature of air-conditioning equipment, set humidity of air-conditioning equipment, an air flow rate of air-conditioning equipment, a set temperature of a refrigerator, a set temperature of a freezer, an illuminance of an illumination, a temperature of a fryer, an available time period of a fryer, a defrosting executable time period of a refrigerator, and a defrosting executable time period of a freezer.

5. The store management system according to supplementary note 3 or 4, wherein
   the generation unit
      acquires the operation plan associated with the store characteristic information from among a plurality of the operation plans being generated in advance.

6. The store management system according to supplementary note 3 or 4, wherein
   the generation unit
      generates the operation plan of the target store by adjusting the operation plan of a standard store being generated in advance, based on the store characteristic information of the standard store and the store characteristic information of the target store.

7. The store management system according to supplementary note 6, wherein
   the generation unit
      classifies a plurality of the stores into groups, based on the store characteristic information, and
      generates the operation plan by adjusting, for each group, the operation plan of the standard store, based on the store characteristic information of the standard store, and the store characteristic information of the target store belonging to each of the groups.

8. The store management system according to any of supplementary notes 3 to 7, wherein
   the generation unit
      adjusts the operation plan of the target store, based on a store electric power correlation model indicating a correlation among a status of the target store, a change in a setting being performed for some pieces of equipment installed in the target store, and a change in electric power consumption of an entirety of a plurality of pieces of equipment installed in the target store.

9. The store management system according to any of supplementary notes 3 to 8, wherein
   the generation unit
      adjusts an operation plan of the target store at every predetermined time interval.

10. The store management system according to any of supplementary notes 3 to 9, wherein
   the generation unit
      adjusts an operation plan of the target store during a time when electric power consumption of the target store exceeds a reference value.

11. A store management method including,
   by a computer:
   a store characteristic information acquisition step of acquiring store characteristic information indicating a characteristic of a target store;
   a store status information acquisition step of acquiring store status information indicating a status of the target store; and
   a generation step of generating control information indicating a setting on equipment installed in the target store, based on the store characteristic information and the store status information.

REFERENCE SIGNS LIST

1 Center server
2 Store server

3 Store equipment group
10 Store management system
11 Store status information acquisition unit
12 Store characteristic information acquisition unit
13 Generation unit
1A Processor
2A Memory
3A Input/output I/F
4A Peripheral circuit
5A Bus

What is claimed is:

1. A store management system comprising:
at least one memory configured to store one or more instructions; and
at least one processor configured to execute the one or more instructions to:
acquire store characteristic information indicating a characteristic of a target store;
acquire store status information indicating a status of the target store;
acquire an operation plan associated with the store characteristic information of the target store;
adjust the operation plan of the target store, based on the store status information of the target store;
generate control information indicating a setting on equipment installed in the target store, based on the store characteristic information, the store status information, and the operation plan after adjustment, wherein an adjustment rule defines a content of adjustment for the operation plan to be performed in a case where a status of the target store satisfies a predetermined condition,
wherein a store electric power correlation model indicates a correlation among a status of the target store, a change in a setting being performed for some pieces of equipment installed in the target store, and a change in electric power consumption of an entirety of a plurality of pieces of equipment installed in the target store, and
wherein the at least one processor is further configured to execute the one or more instructions to:
execute, based on using the adjustment rule in the adjusting the operation plan, the content of adjustment corresponding to the status of the target store as defined in the adjustment rule;
identify, based on using the store electric power correlation model, the content of adjustment for the operation plan of the target store that can lower the electric power consumption of the entirety of the plurality of pieces of equipment; and
adjust, based on a result of the identification, the operation plan of the target store wherein adjusting the operation plan of the target store includes adjusting at least one of: (i) an operation mode, a set temperature, or a set humidity of air-conditioning equipment; or (ii) a fryer availability period or a defrosting executable time period of refrigeration equipment.

2. The store management system according to claim 1, wherein
the store status information includes at least one of electric power consumption, temperature, humidity, weather information, a visitor status, a sales status, an operation status of equipment installed in the target store, an operation status for equipment installed in the target store, and a maintenance status for equipment installed in the target store.

3. The store management system according to claim 1, wherein
the operation plan defines at least one of an operation mode of air-conditioning equipment, a set temperature of air-conditioning equipment, set humidity of air-conditioning equipment, an air flow rate of air-conditioning equipment, a set temperature of a refrigerator, a set temperature of a freezer, an illuminance of an illumination, a temperature of a fryer, an available time period of a fryer, a defrosting executable time period of a refrigerator, and a defrosting executable time period of a freezer.

4. The store management system according to claim 1, wherein
the at least one processor is further configured to execute the one or more instructions to
acquire the operation plan associated with the store characteristic information from among a plurality of the operation plans being generated in advance.

5. The store management system according to claim 1, wherein
the at least one processor is further configured to execute the one or more instructions to
generate the operation plan of the target store by adjusting the operation plan of a standard store being generated in advance, based on the store characteristic information of the standard store and the store characteristic information of the target store.

6. The store management system according to claim 5, wherein
the at least one processor is further configured to execute the one or more instructions to
classify a plurality of stores into groups, based on the store characteristic information, and
generate the operation plan by adjusting, for each group, the operation plan of the standard store, based on the store characteristic information of the standard store, and the store characteristic information of the target store belonging to each of the groups.

7. The store management system according to claim 1, wherein
the at least one processor is further configured to execute the one or more instructions to
adjust the operation plan of the target store, based on a store electric power correlation model indicating the correlation among the status of the target store, the change in the setting being performed for some pieces of equipment installed in the target store, and the change in the electric power consumption of the entirety of the plurality of pieces of equipment installed in the target store.

8. The store management system according to claim 1, wherein
the at least one processor is further configured to execute the one or more instructions to
adjust an operation plan of the target store at every predetermined time interval.

9. The store management system according to claim 1, wherein
the at least one processor is further configured to execute the one or more instructions to
adjust an operation plan of the target store during a time when electric power consumption of the target store exceeds a reference value.

10. A store management method comprising:
storing, by a processor, characteristic information indicating a characteristic of a target store;
acquiring, by the processor, store status information indicating a status of the target store;

acquiring an operation plan associated with the store characteristic information of the target store;

adjusting, by the processor, the operation plan of the target store, based on the store status information of the target store; and generating, by the processor, control information indicating a setting on equipment installed in the target store, based on the store characteristic information, the store status information, and the operation plan after adjustment, wherein an adjustment rule defines a content of adjustment for the operation plan to be performed in a case where a status of the target store satisfies a predetermined condition, wherein a store electric power correlation model indicates a correlation among a status of the target store, a change in a setting being performed for some pieces of equipment installed in the target store, and a change in electric power consumption of an entirety of a plurality of pieces of equipment installed in the target store, and wherein the store management method further comprises:

executing, by the processor, based on using the adjustment rule in the adjusting the operation plan, the content of adjustment corresponding to the status of the target store as defined in the adjustment rule;

identifying, by the processor, based on using the store electric power correlation model, the content of adjustment for the operation plan of the target store that can lower the electric power consumption of the entirety of the plurality of pieces of equipment; and adjusting, by the processor, based on a result of the identification, the operation plan of the target store, wherein adjusting the operation plan of the target store includes adjusting at least one of: (i) an operation mode, a set temperature, or a set humidity of air-conditioning equipment; or (ii) a fryer availability period or a defrosting executable time period of refrigeration equipment.

11. The store management method according to claim 10, wherein the store status information includes at least one of electric power consumption, temperature, humidity, weather information, a visitor status, a sales status, an operation status of equipment installed in the target store, an operation status for equipment installed in the target store, and a maintenance status for equipment installed in the target store.

12. The store management method according to claim 10, wherein the operation plan defines at least one of an operation mode of air-conditioning equipment, a set temperature of air-conditioning equipment, set humidity of air-conditioning equipment, an air flow rate of air-conditioning equipment, a set temperature of a refrigerator, a set temperature of a freezer, an illuminance of an illumination, a temperature of a fryer, an available time period of a fryer, a defrosting executable time period of a refrigerator, and a defrosting executable time period of a freezer.

13. The store management method according to claim 10, wherein the method further comprises:

acquiring the operation plan associated with the store characteristic information from among a plurality of the operation plans being generated in advance.

14. The store management method according to claim 10, wherein the method further comprises:

generating the operation plan of the target store by adjusting the operation plan of a standard store being generated in advance, based on the store characteristic information of the standard store and the store characteristic information of the target store.

15. The store management method according to claim 14, wherein the method further comprises:

classifying a plurality of the-stores into groups, based on the store characteristic information, and generating the operation plan by adjusting, for each group, the operation plan of the standard store, based on the store characteristic information of the standard store, and the store characteristic information of the target store belonging to each of the groups.

16. The store management method according to claim 10, wherein the method further comprises:

adjusting the operation plan of the target store, based on the store electric power correlation model indicating the correlation among the status of the target store, the change in the setting being performed for some pieces of equipment installed in the target store, and the change in the electric power consumption of the entirety of the plurality of pieces of equipment installed in the target store.

17. The store management method according to claim 10, wherein the method further comprises compute adjusting an operation plan of the target store at every predetermined time interval.

18. The store management method according to claim 10, wherein the method further comprises:

adjusting an operation plan of the target store during a time when electric power consumption of the target store exceeds a reference value.

\* \* \* \* \*